(12) United States Patent
Zhao et al.

(10) Patent No.: US 10,852,177 B2
(45) Date of Patent: Dec. 1, 2020

(54) CALIBRATION APPARATUS AND SENSITIVITY DETERMINING MODULE FOR VIRTUAL FLOW METER AND ASSOCIATED METHODS

(71) Applicant: General Electric Company, Schenectady, NY (US)

(72) Inventors: Tong Zhao, Shanghai (CN); Yu Ru, Shanghai (CN)

(73) Assignee: GE OIL & GAS UK LTD, Aberdeen (GB)

( * ) Notice: Subject to any disclaimer, the term of this patent is extended or adjusted under 35 U.S.C. 154(b) by 155 days.

(21) Appl. No.: 15/780,958

(22) PCT Filed: Dec. 22, 2016

(86) PCT No.: PCT/US2016/068187
§ 371 (c)(1),
(2) Date: Jun. 1, 2018

(87) PCT Pub. No.: WO2017/112839
PCT Pub. Date: Jun. 29, 2017

(65) Prior Publication Data
US 2018/0356275 A1    Dec. 13, 2018

(30) Foreign Application Priority Data

Dec. 24, 2015 (CN) .......................... 2015 1 0982667

(51) Int. Cl.
*G01F 25/00* (2006.01)
*G01F 1/34* (2006.01)
(Continued)

(52) U.S. Cl.
CPC ............ *G01F 25/0007* (2013.01); *G01F 1/34* (2013.01); *G01F 5/005* (2013.01); *G01F 9/00* (2013.01)

(58) Field of Classification Search
CPC .......... G01F 1/34; G01F 25/0007; G01F 9/00; G01F 5/005
See application file for complete search history.

(56) References Cited

U.S. PATENT DOCUMENTS

2008/0210470 A1* 9/2008 Stewart .................. E21B 47/06
   175/48
2011/0301851 A1* 12/2011 Briers ..................... E21B 43/16
   702/12
(Continued)

FOREIGN PATENT DOCUMENTS

CN          1316050 A       10/2001
CN          1184458 C        1/2005
(Continued)

OTHER PUBLICATIONS

Haouche, Mohamed, et al., "Virtual Flow Meter pilot: based on Data Validation and Reconciliation Approach", SPE International Production and Operations Conference and Exhibition, pp. 1-13 (May 14, 2012).

(Continued)

*Primary Examiner* — Helen C Kwok
(74) *Attorney, Agent, or Firm* — Baker Hughes Patent Organization

(57) ABSTRACT

The present disclosure relates to a calibration device for calibrating a virtual flow meter of a production system. The production system includes components for transferring fluid, where the virtual flow meter is configured to estimate a flow rate of the fluid based on property values of the components and values of variable parameters of the components. The calibration device includes a sensitivity determining module configured to calculate a first sensitivity, where the first sensitivity is used to indicate a degree of change of the values of the variable parameters relative to (Continued)

disturbance of the property values, and a calibration module configured to calibrate the virtual flow meter according to the first sensitivity.

5 Claims, 11 Drawing Sheets

(51) Int. Cl.
    *G01F 5/00*    (2006.01)
    *G01F 9/00*    (2006.01)

(56) References Cited

U.S. PATENT DOCUMENTS

| | | | | |
|---|---|---|---|---|
| 2012/0232756 | A1* | 9/2012 | Yuan | F15B 19/002 701/41 |
| 2014/0278302 | A1 | 9/2014 | Ziegel et al. | |
| 2016/0265341 | A1* | 9/2016 | Subervie | F04D 15/0066 |
| 2017/0051581 | A1* | 2/2017 | Parolini | E21B 41/0092 |

FOREIGN PATENT DOCUMENTS

| | | |
|---|---|---|
| CN | 102213606 A | 10/2011 |
| CN | 102353403 A | 2/2012 |
| CN | 202281632 U | 6/2012 |
| CN | 102538911 A | 7/2012 |
| CN | 104881052 A | 9/2015 |
| JP | H10-311280 A | 11/1998 |
| JP | 5111448 B2 | 1/2013 |
| WO | 2013/171666 A1 | 11/2013 |
| WO | 2015/073626 A1 | 5/2015 |

OTHER PUBLICATIONS

Song, L., et al., "Uncertainty analysis for a virtual flow meter using an air-handling unit chilled water valve," HVAC&R Research, vol. 19, Issue 3, pp. 335-345 (Feb. 20, 2013).

Song, L., et al.,"Uncertainty analysis of a virtual water flow measurement in building energy consumption monitoring," HVAC&R Research, vol. 18, Issue 5, pp. 997-1010 (Apr. 3, 2012).

International Search Report and Written Opinion issued in connection with corresponding PCT Application No. PCT/US2016/068187 dated Mar. 17, 2017.

Machine translation and First Office Action and Search issued in connection with corresponding CN Application No. 201510982667.0 dated Dec. 20, 2018.

* cited by examiner

CALIBRATION APPARATUS AND SENSITIVITY DETERMINING MODULE FOR VIRTUAL FLOW METER AND ASSOCIATED METHODS

TECHNICAL FIELD

The present disclosure relates to the field of virtual flow metering, and to a calibration device and a sensitivity determining device for a virtual flow meter, and corresponding methods.

BACKGROUND

In terms of a production system involving single phase and multiphase flow rates, its flow rate usually needs to be metered. In terms of a production system involving underground and underwater operations, typically such as an oil production system in an underground oil field, a physical flow meter is very expensive and features large installation and maintenance costs; therefore, a virtual flow meter is usually required to meter a flow.

A production system includes components for transferring fluid, and a virtual flow meter uses measurement values (such as pressure and temperature) of the components measured by using sensors to estimate a multiphase flow rate (such as oil, gas, and water). A degree of accuracy of a model representing a correlation between the flow rates and the measurement values measured by the sensors is important. In an application of the oil production system of the oil field, a typical model representing the correlation between the flow rates and the measurement values measured by the sensors is a pressure drop model of each component, and corresponding model parameters include fluid density and viscosity, component surface roughness, discharging function coefficients of components with a discharging function, and the like. Sensitivity analysis is an important and effective method for calibrating the model and ensuring the accuracy of the model. The sensitivity analysis is namely to evaluate an impact of perturbation of a specific model parameter on model output. For example, the sensitivity analysis may represent, for example, how a pipe pressure drop deviates from its reference value when the fluid density experiences perturbation. The production system may also be other systems that need to use a virtual flow meter, for example, a gas gathering system in an undersea gas field.

During calibration of a virtual flow meter, it is ideal to calculate a sensitivity of an estimated flow rate relative to each model parameter. However, it is extremely complex and hard to directly calculate a sensitivity of an estimated multiphase flow rate relative to each model parameter.

Moreover, a commonly-used sensitivity calculation method is a Finite Difference Method (FDM). However, since an output of a virtual flow meter is an estimated multiphase flow rate, and a function of a model output relative to a model parameter change may experience a peak or discontinuity in an application of the virtual flow meter, it is not safe or proper to apply the Finite Difference Method to the virtual flow meter.

Therefore, it is necessary to provide an improved calibration device and method and sensitivity determining device and method for a virtual flow meter to resolve the above-mentioned problem.

BRIEF DESCRIPTION

An objective of the present invention is to provide a calibration device and a sensitivity determining device for a virtual flow meter, and corresponding methods.

In one aspect, an embodiment of the present invention relates to a calibration device for calibrating a virtual flow meter of a production system, where the production system includes components for transferring fluid, where the virtual flow meter is configured to estimate a flow rate of the fluid based on property values of the components and values of variable parameters of the components, and the calibration device includes a sensitivity determining module configured to calculate a first sensitivity, where the first sensitivity is used to indicate a degree of change of the values of the variable parameters relative to perturbation of the property values; and a calibration module configured to calibrate the virtual flow meter according to the first sensitivity.

Another aspect of the present disclosure provides a sensitivity determining module applied to a virtual flow meter of a production system, where the production system includes components for transferring fluid, the virtual flow meter is configured to estimate a flow rate of the fluid based on property values of the components and values of variable parameters of the components, and the sensitivity determining module includes: a value determination unit, configured to apply perturbation to the property values according to a perturbation size, to obtain multiple perturbation values, and determine multiple values of the variable parameters corresponding to the multiple perturbation values based on the virtual flow meter; a linear regression unit, configured to use linear regression to approximate the multiple values of the variable parameters, to obtain an approximation result; and a sensitivity obtaining module, configured to obtain a first sensitivity according to the approximation result, where the first sensitivity is used to indicate a degree of change of the values of the variable parameters relative to perturbation of the property values.

Still another aspect of the present disclosure provides a calibration method for calibrating a virtual flow meter of a production system, where the production system includes components for transferring fluid, where the virtual flow meter is configured to estimate a flow rate of the fluid based on property values of the components and values of variable parameters of the components, and the calibration method includes: a sensitivity determining step, that is, calculating a first sensitivity, where the first sensitivity is used to indicate a degree of change of the values of the variable parameters relative to perturbation of the property values; and a calibration step, that is, calibrating the virtual flow meter according to the first sensitivity.

Yet another aspect of the present disclosure provides a sensitivity determining method applied to a virtual flow meter of a production system, where the production system includes components for transferring fluid, the virtual flow meter is configured to estimate a flow rate of the fluid based on property values of the components and values of variable parameters of the components, and the sensitivity determining method includes: a value determining step, that is, applying perturbation to the property values according to a perturbation size, to obtain multiple perturbation values, and determining multiple values of the variable parameters corresponding to the multiple perturbation values based on the virtual flow meter; a linear regression step, that is, using linear regression to approximate the multiple values of the variable parameters, to obtain an approximation result; and a sensitivity obtaining step, that is, obtaining a first sensitivity, where the first sensitivity is used to indicate a degree of change of the values of the variable parameters relative to perturbation of the property values.

BRIEF DESCRIPTION OF DRAWINGS

The present disclosure may be understood in a better way by describing the implementation manners of the present disclosure with reference to the accompanying drawings, and in the accompanying drawings.

DETAILED DESCRIPTION

"Comprise", "include", "have", and similar terms used in the present application mean to encompass the items listed thereafter and equivalents thereof as well as other additional items. Approximating language in the present application is used to modify a quantity, indicating that the present invention is not limited to the specific quantity, and may include modified parts that are close to the quantity, are acceptable, and do not lead to change of related basic functions.

In the specification and abstract, unless otherwise clearly indicated, no limitation is imposed on singularity and plurality of all items. Throughout this patent application specification and claims, "first", "second" and similar words do not denote any order, quantity, or importance, but are used to distinguish the different materials and embodiments.

Unless otherwise clearly indicated, the terms "OR", "or" do not mean exclusiveness, but mean at least one of the mentioned items (such as ingredients), and include a situation where a combination of the mentioned items exists.

"Some embodiments" and the like mentioned in the present application specification represent that specific elements (such as a characteristic, structure, and/or feature) related to the present invention are included in at least one embodiment described in the specification, and may or may not appear in another embodiment. In addition, it should be understood that the invention elements can be combined in any manner.

The following describes the embodiments of the present invention with reference to the accompanying drawings, and may not describe in detail functions or structures that are well known, to prevent unnecessary details that may make the present invention hard to understand.

Figure 1:
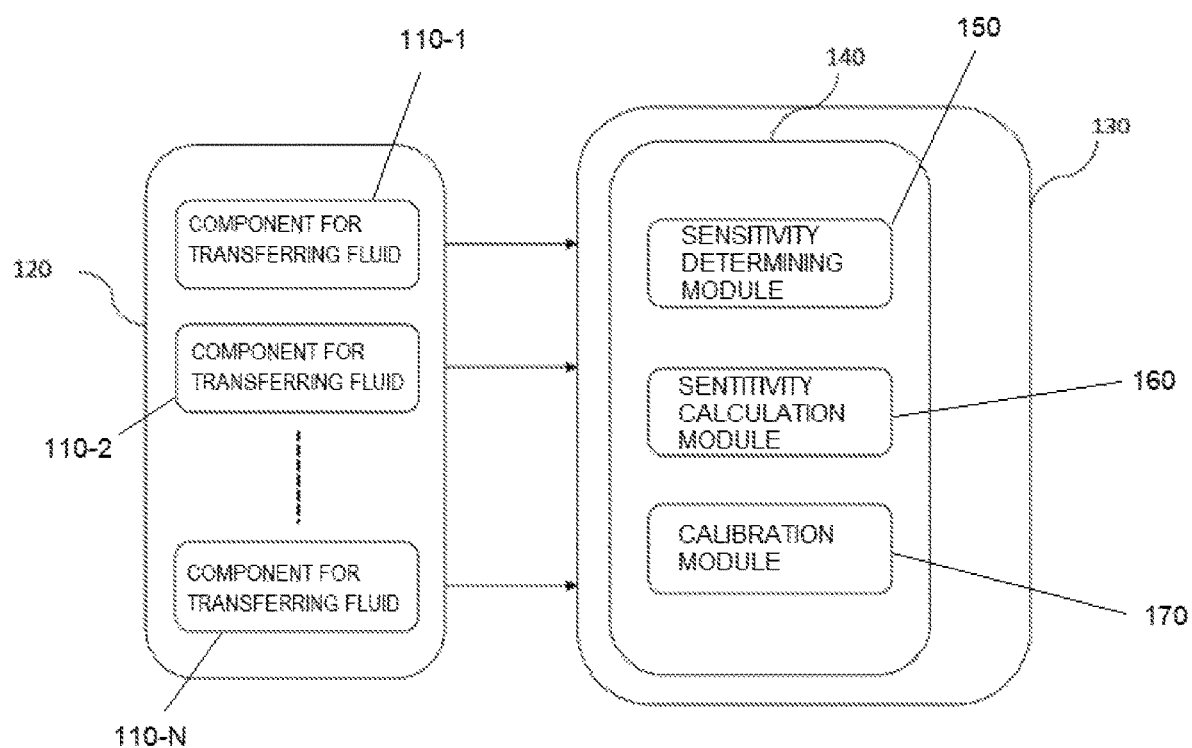
FIG. 1 is a schematic diagram of a calibration device, virtual flow meter, and production system according to an embodiment of the present disclosure.

FIG. 1 is a schematic diagram of using a calibration device 140 to calibrate a virtual flow meter 130 of a production system 120 according to a specific embodiment of the present disclosure.

In some embodiments, the production system 120 includes but is not limited to an oil production system in an underground oil field. The production system 120 is shown in FIG. 1, and the production system 120 may include multiple components 110-1, 110-2, . . . , 110-N for transferring fluid, where N is a natural number. In some embodiments, the components 110-1, 110-2, . . . , 110-N include but are not limited to a pipe, a valve, a pump, a choke tube, or any combination thereof.

The components 110-1, 110-2, . . . , 110-N have a steady property or have a steady property in a relatively long period of time (for example, tens of days, months, or even years); in some embodiments, properties of the components 110-1, 110-2, . . . , 110-N include but are not limited to properties indicating dimensions, such as length, width, and diameter, and properties indicating a surface structure, such as roughness. In some embodiments, $\theta_1, \theta_2, \ldots, \theta_n$ are used to represent properties of the components of the production system 120, and $\sigma_1, \sigma_2, \ldots, \sigma_n$ are respectively used to represent property values corresponding to the properties $\theta_1, \theta_2, \ldots, \theta_n$.

The components 110-1, 110-2, . . . , 110-N may also correspond to variable parameters, where values of the variable parameters may change with a flow of fluid; in some embodiments, the variable parameters of the components 110-1, 110-2, . . . , 110-N include but are not limited to temperatures, pressure drops and the like of the components 110-1, 110-2, . . . , 110-N. In some embodiments, a sensor (not shown in figure) may be set on the production system 120, to measure and obtain the values of the variable parameters of the components 110-1, 110-2, . . . , 110-N. In some embodiments, $P_1, P_2, \ldots, P_n$ are used to represent pressure drops at multiple locations of the production system 120, $p_1, p_2, \ldots, p_n$ are used to represent values respectively corresponding to $P_1, P_2, \ldots, P_n$; and $T_1, T_2, \ldots, T_n$ are used to represent temperatures at multiple locations of the production system 120, and $t_1, t_2, \ldots, t_n$ are used to represent values respectively corresponding to $T_1, T_2, \ldots, T_n$.

Property values of properties of the components 110-1, 110-2, . . . , 110-N are set on the virtual flow meter 130, and the virtual flow meter 130 may obtain the values of the variable parameters of the components 110-1, 110-2, . . . , 110-N; in some embodiments, the values of the variable parameters obtained by the virtual flow meter 130 come from the sensor in the production system 120. Since the flow of the fluid may cause impact on the values of the variable parameters, therefore the virtual flow meter 130 can estimate a flow rate of the fluid in combination with the values of the variable parameters and the property values that are of the components 110-1, 110-2, . . . , 110-N. In some embodiments, the virtual flow meter 130 includes a forward model (not shown in the figure), and may obtain the values of the variable parameters of the components 110-1, 110-2, . . . , 110-N by using the forward model in combination with the flow rate of the fluid and property values of the components 110-1, 110-2, . . . , 110-N; in some embodiments, the virtual flow meter 130 may obtain the flow rate of the fluid by using backstepping of the forward model in combination with the values of the variable parameters and the property values of the components 110-1, 110-2, . . . , 110-N.

The calibration device 140 may be applied to calibrate the virtual flow meter 130. In some embodiments, as shown in FIG. 1, the virtual flow meter 130 includes the calibration device 140; in some embodiments, the calibration device 140 and the virtual flow meter 130 may also be set and implemented independently (not shown in figure).

The calibration device 140 includes a sensitivity determining module 150 configured to calculate a first sensitivity, and a calibration module 170 configured to calibrate the virtual flow meter 130 according to the first sensitivity.

The first sensitivity determined by the sensitivity determining module 150 can indicate a degree of change of the values of the variable parameters relative to perturbation of the property values. By using calculation of the first sensitivity $$\frac{\Delta P_1}{\Delta \theta_1}$$

as an example, $$\frac{\Delta P_1}{\Delta \theta_1}$$

is used to indicate a degree of change of a value of a pressure drop $P_1$ of the component 110-1 relative to perturbation of a property value $\sigma_1$ of a property $\theta_1$ of the component 110-1. The sensitivity determining module 150 may apply, when the flow rate is fixed, perturbation to the property value $\sigma_1$ of the property $\theta_1$ of one component set in the virtual flow meter 130 or a model similar to the virtual flow meter 103 by many times, to obtain multiple perturbation values $\sigma_{11}$, $\theta_{12}$, . . . , $\theta_{1n}$ of the property value $\sigma_1$ and multiple values $p_{11}$, $p_{12}$, . . . , $p_{1n}$ of a variable parameter (for example, the pressure drop $P_1$) of the component corresponding to the multiple perturbation values $\sigma_{11}$, $\sigma_{12}$, . . . , $\propto_{1n}$. Therefore, the sensitivity determining module 150 can obtain the first sensitivity $$\frac{\Delta P_1}{\Delta \theta_1}.$$

Similarly, the sensitivity determining module 150 can also determine other first sensitivities, such as $$\frac{\Delta P_2}{\Delta \theta_2}, \frac{\Delta P_3}{\Delta \theta_3}, \ldots, \frac{\Delta P_n}{\Delta \theta_n}.$$

When the variable parameter is temperature $T_1$ of the component 110-1, first sensitivities $$\frac{\Delta T_1}{\Delta \theta_1}, \frac{\Delta T_2}{\Delta \theta_2}, \ldots, \frac{\Delta T_n}{\Delta \theta_n}$$

may further be obtained, where n is a natural number.

The calibration module 170 calibrates the virtual flow meter 130 according to the first sensitivity. In some embodiments, the calibration module 170 calibrates the property value $\sigma_1$ set in the virtual flow meter 130 according to the first sensitivity $$\frac{\Delta P_1}{\Delta \theta_1}.$$

In some embodiments, the calibration module 170 may select at least one first sensitivity from multiple first sensitivities $$\frac{\Delta P_1}{\Delta \theta_1}, \frac{\Delta P_2}{\Delta \theta_2}, \ldots, \frac{\Delta P_n}{\Delta \theta_n} \text{ and } \frac{\Delta T_1}{\Delta \theta_1}, \frac{\Delta T_2}{\Delta \theta_2}, \ldots, \frac{\Delta T_n}{\Delta \theta_n}$$

determined by the sensitivity determining module 150, such as a maximum first sensitivity or a first sensitivity exceeding a threshold, and calibrates the virtual flow meter 130 by using the selected first sensitivity.

In some embodiments, the calibration device 140 includes a sensitivity calculation module 160 configured to calculate a second sensitivity, where the second sensitivity indicates a degree of change of the flow rate relative to perturbation of the values of the variable parameters. In some embodiments, similar to the calculation of the first sensitivity, the sensitivity calculation module 160 may apply, when the property values are fixed, perturbation to the values of the variable parameters received by the virtual flow meter 130 or a model similar to the virtual flow meter 130, so as to calculate the second sensitivity, such as $$\frac{\Delta f}{\Delta P_1}, \frac{\Delta f}{\Delta P_2}, \ldots, \frac{\Delta f}{\Delta P_n} \text{ or } \frac{\Delta f}{\Delta T_1}, \frac{\Delta f}{\Delta T_2}, \ldots, \frac{\Delta f}{\Delta T_n}; \text{ and}$$

$$\frac{\Delta f}{\Delta P_1}, \frac{\Delta f}{\Delta P_2}, \ldots, \frac{\Delta f}{\Delta P_n}$$

indicate a degree of change of a flow rate f relative to perturbation of values of pressure drops $P_1, P_2, \ldots, P_n$, and $$\frac{\Delta f}{\Delta T_1}, \frac{\Delta f}{\Delta T_2}, \ldots, \frac{\Delta f}{\Delta T_n}$$

indicate a degree of change of a flow rate f relative to perturbation of values of temperatures $T_1, T_2, \ldots, T_n$.

In some embodiments, the calibration module 170 obtains a third sensitivity according to the first sensitivity and the second sensitivity, and calibrates the virtual flow meter 130 according to the third sensitivity, where the third sensitivity is used to indicate a degree of change of the flow rate relative to perturbation of the property values, for example, $$\frac{\Delta f}{\Delta \theta_1}, \frac{\Delta f}{\Delta \theta_2}, \ldots, \frac{\Delta f}{\Delta \theta_n}.$$

In some embodiments, the calibration module 170 obtains the third sensitivity according to the product of the first sensitivity and the second sensitivity. In some embodiments, the calibration module 170 calibrates the property values set in the virtual flow meter 130 according to the third sensitivity. For example, the calibration module 170 obtains the third sensitivity $$\frac{\Delta f}{\Delta \theta_1}$$

according to the product of the first sensitivity $$\frac{\Delta P_1}{\Delta \theta_1}$$

and the second sensitivity $$\frac{\Delta f}{\Delta P_1},$$

and calibrates the property value $\sigma_1$ set in the virtual flow meter 130 according to the third sensitivity $$\frac{\Delta f}{\Delta \theta_1}.$$

In the virtual flow metering, a degree of accuracy of the flow rate estimation depends on accuracy of a model of the virtual flow meter 130. To calibrate the virtual flow meter 130, a sensitivity relationship between a flow rate and a property of a component is usually used to calibrate. However, due to reasons such as complexity of the virtual flow meter 130, it is extremely complex to directly calculate a sensitivity relationship (for example, directly calculating $$\frac{\Delta f}{\Delta \theta_1})$$

between a flow rate and a property of a component. The foregoing embodiments provide a method for calibrating the virtual flow meter 130 by using a sensitivity relationship between a variable parameter and a property, which greatly simplifies complexity of calculation required for calibration; in addition, the foregoing embodiments further provide a method for determining a sensitivity relationship between a flow rate and a property based on a sensitivity relationship between a variable parameter and the property, resolving a problem in the prior art that it is hard to calculate a sensitivity relationship between a flow rate and a property of a component.

The following details multiple embodiments of calculating the first sensitivity $$\frac{\Delta P_1}{\Delta \theta_1}$$

by the sensitivity determining module 150 with reference to FIG. 2 to FIG. 5. The method for calculating another first sensitivity $$\frac{\Delta P_2}{\Delta \theta_2}, \frac{\Delta P_3}{\Delta \theta_3}, \ldots, \frac{\Delta P_n}{\Delta \theta_n}$$

by the sensitivity determining module 150 and the method for calculating the second sensitivity by the sensitivity calculation module 160 are similar to the method for calculating $$\frac{\Delta P_1}{\Delta \theta_1},$$

and are not described herein any more.

Figure 2:
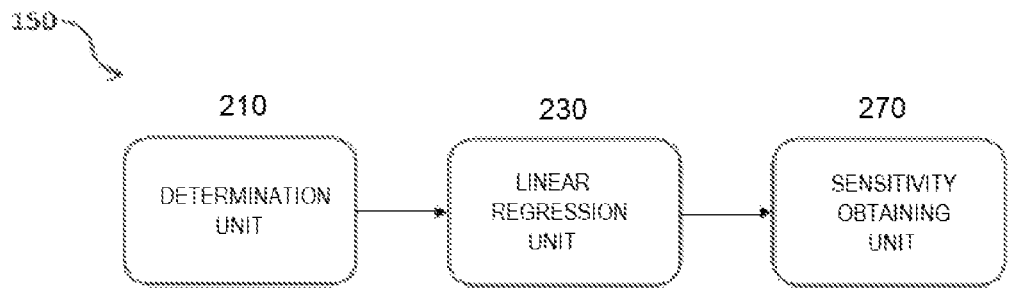
FIG. 2 is a schematic diagram of a sensitivity determining module according to an embodiment of the present disclosure.

FIG. 2 is a schematic diagram of a sensitivity determining module 150 according to a specific embodiment of the present disclosure. As shown in FIG. 2, the sensitivity determining module 150 includes: a value determination unit 210, configured to apply perturbation to property values according to a perturbation size, to obtain multiple perturbation values, and determine multiple values of the variable parameters corresponding to the multiple perturbation values; a linear regression unit 230, configured to use linear regression to approximate the multiple values of the variable parameters, to obtain an approximation result; and a sensitivity obtaining unit 270, configured to the first sensitivity according to the approximation result.

The value determination unit 210 applies perturbation to a property value $\sigma_1$ of the component 110-1 according to a preset perturbation size $\delta_1$, to obtain multiple perturbation values $\sigma_{11}, \sigma_{12}, \ldots, \sigma_{1n}$. In some embodiments, the value determination unit 210 determines a perturbation range to be from $-\delta_1 \cdot \sigma_1$ to $+\delta_1 \cdot \sigma_1$ according to the perturbation size $\delta_1$ and the property value $\sigma_1$, and selects multiple perturbation values $\sigma_{11}, \sigma_{12}, \ldots, \sigma_{1n}$ from the perturbation range. In some embodiments, $\sigma_1$ is normalized to be a rated value, for example 1, and the perturbation range is from $-\delta_1$ to $+\delta_1$, and $\delta_1$ is greater than 0 and less than 1.

In addition, the value determination unit 210 determines, according to the multiple perturbation values $\sigma_{11}, \sigma_{12}, \ldots, \sigma_{1n}$, the multiple values $p_{11}, p_{12}, \ldots, p_{1n}$ of the pressure drop $P_1$ corresponding to $\sigma_{11}, \sigma_{12}, \ldots, \sigma_{1n}$. In some embodiments, the value determination unit 210 obtains $p_{11}, p_{12}, \ldots, p_{1n}$ according to the virtual flow meter 130 or a model similar to at least a part of the virtual flow meter 130; for example, the virtual flow meter 130 includes a forward model, and the value determination unit 210 uses a flow rate f as an input of the forward model, and sets a property value of a property $\theta_1$ to $\sigma_{11}, \sigma_{12}, \ldots, \sigma_{1n}$, to obtain $p_{11}, p_{12}, \ldots, p_{1n}$ output by the forward model.

The linear regression unit 230 uses linear regression to approximate $p_{11}, p_{12}, \ldots, p_{1n}$, to obtain an approximation result of linear regression. In some embodiments, the approximation result is denoted as $P_1 = k_0 + k_1 \cdot \theta_1$.

The sensitivity obtaining unit 270 obtains the first sensitivity $$\frac{\Delta P_1}{\Delta \theta_1}$$

according to the approximation result of linear regression. In some embodiments, the first sensitivity is $$\frac{\Delta P_1}{\Delta \theta_1} = k_1.$$

In some embodiments, the sensitivity obtaining unit 270 processes the $k_1$, for example, normalization, to obtain the first sensitivity $$\frac{\Delta P_1}{\Delta \theta_1}.$$

Figure 3:
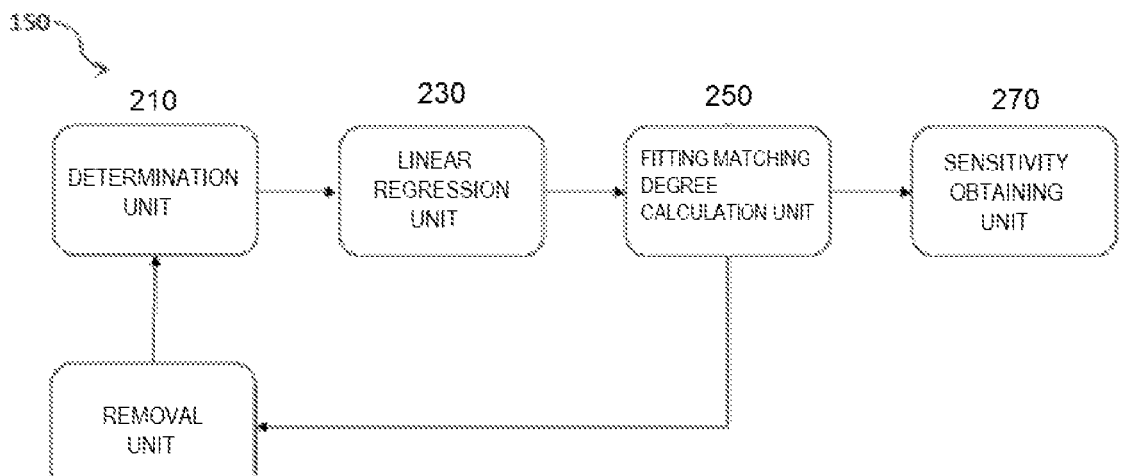
FIG. 3 is a schematic diagram of a sensitivity determining module according to another embodiment of the present disclosure.

FIG. 3 is a schematic diagram of a sensitivity determining module 150 according to a specific embodiment of the present disclosure. The embodiment described in FIG. 3 is a variant embodiment of the embodiment described in FIG. 2, while the difference lies in that the sensitivity determining module 150 further includes: a fitting matching degree calculation unit 250, configured to calculate a fitting matching degree between multiple values of variable parameters and an approximation result of linear regression, and output the approximation result to the sensitivity obtaining unit 270 when the fitting matching degree falls within a preset range; and a perturbation size adjusting unit 252, configured to: when the fitting matching degree does not fall within the preset range, adjust a perturbation size, and output an adjusted perturbation size to the value determination unit 210.

The value determination unit 210 applies perturbation to a property value $\sigma_1$ of the component 110-1 according to a preset perturbation size $\delta_1$, to obtain multiple perturbation values $\sigma_{11}, \sigma_{12}, \ldots, \sigma_{1n}$, and determines multiple values $p_{11}, p_{12}, \ldots, p_{1n}$ of a pressure drop $P_1$ corresponding to $\sigma_{11}, \sigma_{12}, \ldots, \sigma_{1n}$. The linear regression unit 230 uses linear regression to approximate $p_{11}, p_{12}, \ldots, p_{1n}$, to obtain an approximation result of linear regression.

The fitting matching degree calculation unit 250 calculates a fitting matching degree between the multiple values $p_{11}, p_{12}, \ldots, p_{1n}$ of the pressure drop $P_1$ and the approximation result obtained by the linear regression unit 230. In some embodiments, a goodness of fit may be calculated to be a fitting matching degree. In some embodiments, a mean absolute error or a mean square error may be calculated to be a fitting matching degree.

When the fitting matching degree falls within a preset range, for example, the fitting matching degree is greater than a preset threshold, the fitting matching degree calculation unit 250 outputs the approximation result to the sensitivity obtaining unit 270, so that the sensitivity obtaining unit 270 determines the first sensitivity $$\frac{\Delta P_1}{\Delta \theta_1}$$

according to the approximation result of linear regression.

When the fitting matching degree calculated by the fitting matching degree calculation unit 250 does not fall within the preset range, for example, the fitting matching degree is less than and equal to a preset threshold, a perturbation size change unit 252 adjusts $\delta_1$, for example, increasing the perturbation size $\delta_1$ to be $\delta_2$, and outputs $\delta_2$ to the value determination unit 210.

The value determination unit 210 and the linear regression unit 230 re-operate, to obtain a new approximation result of linear regression. Because a fitting matching degree between the new approximation result of linear regression and $p_{11}, p_{12}, \ldots, p_{1n}$ usually falls within a preset range, the linear regression unit 230 may directly output the new approximation result of linear regression to the sensitivity obtaining unit 270. Alternatively, the linear regression unit 230 outputs the new approximation result of linear regression to the fitting matching degree calculation unit 250, and the fitting matching degree calculation unit 250 calculates a fitting matching degree between the multiple values $p_{11}, p_{12}, \ldots, p_{1n}$ of the pressure drop $P_1$ and the new approximation result. This process is repeated until the fitting matching degree falls within the preset range, and the fitting matching degree calculation unit 250 may output an approximation result, when the fitting matching degree between the approximation result with $p_{11}, p_{12}, \ldots, p_{1n}$ falls within the preset range, to the sensitivity obtaining unit 270, so as to obtain the first sensitivity $$\frac{\Delta P_1}{\Delta \theta_1}.$$

An oversized perturbation size leads to a large amount of calculation, while an undersized perturbation size may easily lead to an inaccurate calculation result. An appropriate perturbation size may be determined by introducing a fitting matching degree. For example, a relatively small perturbation size is selected first, then whether to increase the perturbation size is determined according to a fitting matching degree of linear regression, thereby avoiding a large amount of calculation when a large perturbation size is directly selected once, improving accuracy of sensitivity calculation at the same time, and balancing complexity and accuracy of sensitivity calculation.

Figure 4:
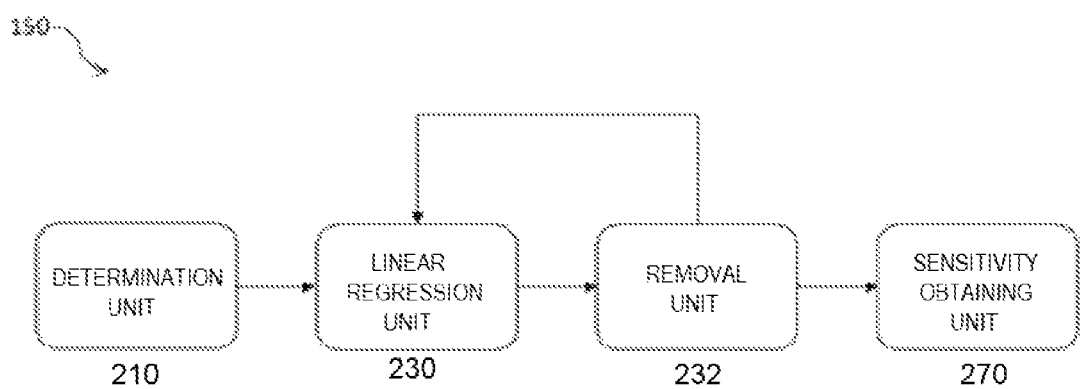
FIG. 4 is a schematic diagram of a sensitivity determining module according to still another embodiment of the present disclosure.

FIG. 4 is a schematic diagram of a sensitivity determining module 150 according to a specific embodiment of the present disclosure. The embodiment described in FIG. 4 is a variant of the embodiment described in FIG. 2, while the difference lies in that the sensitivity determining module 150 includes a removal unit 232, configured to: when it is determined according to an approximation result that an outlier exists in multiple values of variable parameters, remove the outlier, and output the values of the variable parameters after the removal of the outlier to the linear regression unit 230; and when it is determined according to the approximation result that no outlier exists in the multiple values of the variable parameters, output the approximation result of linear regression to the sensitivity obtaining unit 270.

The value determination unit 210 applies perturbation to a property value $\sigma_1$ of the component 110-1 according to a preset perturbation size $\delta_1$, to obtain multiple perturbation values $\sigma_{11}, \sigma_{12}, \ldots, \sigma_{1n}$, and determines multiple values $p_{11}, p_{12}, \ldots, p_{1n}$ of a pressure drop $P_1$ corresponding to $\sigma_{11}, \sigma_{12}, \ldots, \sigma_{1n}$. The linear regression unit 230 uses linear regression to approximate $p_{11}, p_{12}, \ldots, p_{1n}$, to obtain an approximation result of linear regression.

When it is determined according to the approximation result that no outlier exists in $p_{11}, p_{12}, \ldots, p_{1n}$, the removal unit 232 outputs the approximation result of linear regression to the sensitivity obtaining unit 270.

When it is determined according to the approximation result that an outlier exists in the multiple values $p_{11}, p_{12}, \ldots, p_{1n}$ of a pressure drop $P_1$, the removal unit 232 removes the outlier, and outputs the multiple values $p'_{11}, p'_{12}, \ldots, p'_{1m}$ of the pressure drop $P_1$ after the removal of the outlier to the linear regression unit 230, so that the linear regression unit 230 obtains a new approximation result according to $p'_{11}, p'_{12}, \ldots, p'_{1m}$. The new approximation result may be output by the linear regression unit 230 to the sensitivity obtaining unit 270, or may be output, after the removal unit 232 determines that no outlier exists, to the sensitivity obtaining unit 270, so that the sensitivity obtaining unit 270 obtains the first sensitivity $$\frac{\Delta P_1}{\Delta \theta_1},$$

where m is a natural number, and m is less than n; and the number of removed outliers is n-m.

An outlier includes a value that severely deviates from the approximation result of linear regression. In some embodiments, when a ratio of a linear regression error of a value (for example $p_{11}$) of the pressure drop $P_1$ to a statistical result of linear regression errors of all values (for example, $p_{11}, p_{12}, \ldots, p_{1n}$) of the pressure drop $P_1$ is beyond a constant range (for example, a linear regression error of $p_{11}$ is more than a times a standard deviation of a linear regression error of $p_{11}, p_{12}, \ldots, p_{1n}$).

By means of removal of an outlier and re-performing linear regression, a peak value in a result of linear regression is further eliminated, so that accuracy and robustness of sensitivity calculation are improved.

Figure 5:
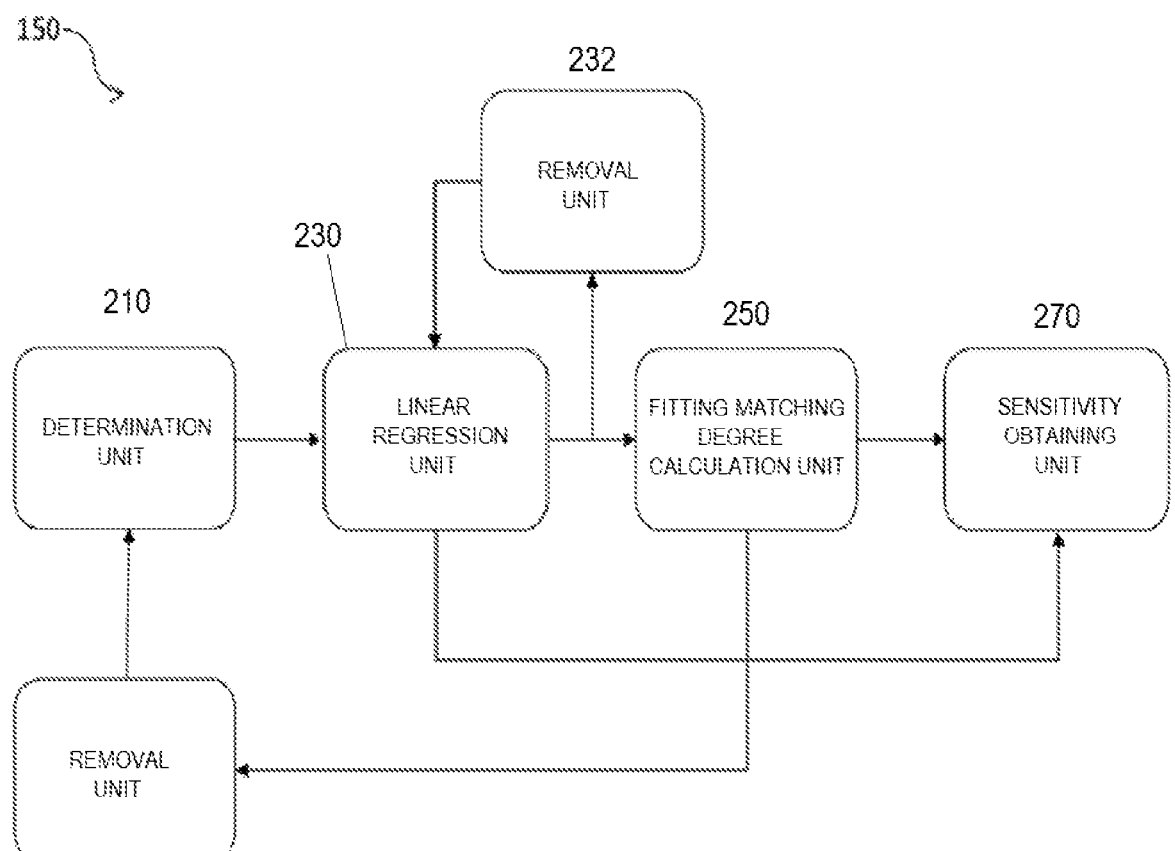
FIG. 5 is a schematic diagram of a sensitivity determining module according to yet another embodiment of the present disclosure.

FIG. 5 is a schematic diagram of a sensitivity determining module 150 according to a specific embodiment of the present disclosure. The embodiment described in FIG. 5 is a variant of the embodiments described in FIG. 3 and FIG. 4. In the embodiment, the sensitivity determining module 150 includes a value determination unit 210, a linear regression unit 230, a removal unit 232, a fitting matching degree calculation unit 250, a perturbation size adjusting unit 252, and a sensitivity obtaining unit 270.

The value determination unit 210 applies perturbation to a property value $\sigma_1$ of the component 110-1 according to a preset perturbation size $\delta_1$, to obtain multiple perturbation values $\sigma_{11}, \sigma_{12}, \ldots, \sigma_{1n}$, and determines multiple values $p_{11}, p_{12}, \ldots, p_{1n}$ of a pressure drop $P_1$ corresponding to $\sigma_{11}, \sigma_{12}, \ldots, \sigma_{1n}$.

The linear regression unit 230 uses linear regression to approximate $p_{11}, p_{12}, \ldots, p_{1n}$, to obtain an approximation result of linear regression.

The fitting matching degree calculation unit 250 calculates a fitting matching degree between multiple values $p_{11}, p_{12}, \ldots, p_{1n}$ of the pressure drop $P_1$ and the approximation result obtained by the linear regression unit 230, and outputs the approximation result to the sensitivity obtaining unit 270 when the fitting matching degree falls within a preset range, so as to obtain the first sensitivity $$\frac{\Delta P_1}{\Delta \theta_1}.$$

When the fitting matching degree does not fall within the preset range, the perturbation size adjusting unit 252 adjusts a perturbation size, for example, increasing the perturbation size $\delta_1$ to be $\delta_2$, and outputs an adjusted perturbation size $\delta_2$ to the value determination unit 210.

The value determination unit 210 applies perturbation to a property value $\sigma_1$ of the component 110-1 according to an increased perturbation size $\delta_2$, to obtain multiple perturbation values $\sigma'_{11}, \sigma'_{12}, \ldots, \sigma'_{1n}$, and determines multiple values $p'_{11}, p'_{12}, \ldots, p'_{1n}$ of a pressure drop $P_1$ corresponding to $\sigma'_{11}, \sigma'_{12}, \ldots, \sigma'_{1n}$.

The linear regression unit 230 uses linear regression to approximate $p'_{11}, p'_{12}, \ldots, p'_{1n}$, to obtain a new approximation result of linear regression.

When it is determined according to the new approximation result that an outlier exists in the multiple values $p'_{11}, p'_{12}, \ldots, p'_{1n}$ of the pressure drop $P_1$, the removal unit 232 removes the outlier, and outputs the multiple values of the pressure drop $P_1$ after the removal of the outlier to the linear regression unit 230, so that the linear regression unit 230 obtains another new approximation result according to the multiple values of the pressure drop $P_1$. The another new approximation result may be output by the linear regression unit 230 to the sensitivity obtaining unit 270, so that the sensitivity obtaining unit 270 obtains the first sensitivity $$\frac{\Delta P_1}{\Delta \theta_1}.$$

In combination with a fitting matching degree and removal of an outlier, accuracy and robustness of sensitivity calculation are further improved.

Figure 6:
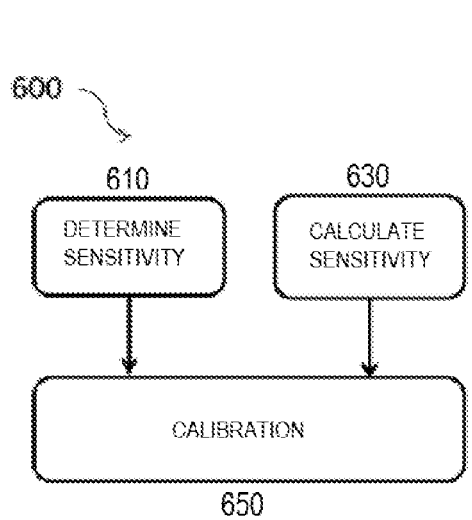
FIG. 6 is a general flowchart of a calibration method for a virtual flow meter according to an embodiment of the present disclosure.

FIG. 6 is a general flowchart of a calibration method 600 for a virtual flow meter 130 according to a specific embodiment of the present disclosure. With reference to FIG. 1 and FIG. 6, the calibration method 600 includes: sensitivity determining step 610 for calculating a first sensitivity; and calibration step 650 for calibrating the virtual flow meter 130 according to the first sensitivity. The first sensitivity is used to indicate a degree of change of the values of the variable parameters relative to perturbation of the property values. In some embodiments, the calibration method 600 further includes: sensitivity calculating step 630 for calculating a second sensitivity, where calibration step 650 is used for obtaining a third sensitivity according to the first sensitivity and the second sensitivity, and calibrating the virtual flow meter according to the third sensitivity.

Figure 7:
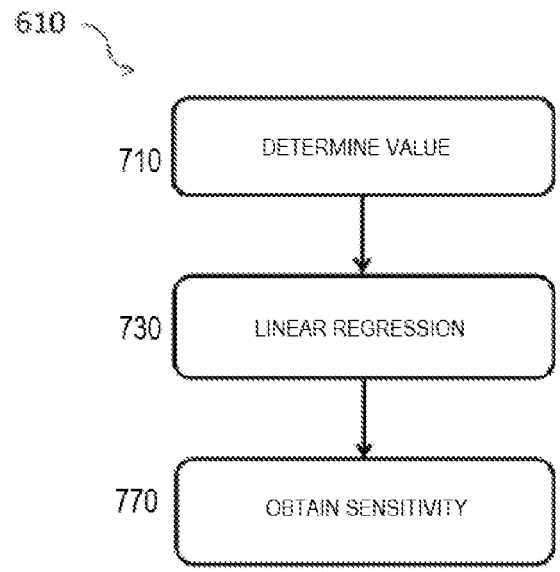
FIG. 7 is a schematic flowchart of the sensitivity determining step in the calibration method in FIG. 6 according to an embodiment.

FIG. 7 is a schematic flowchart of sensitivity determining step 610 in the calibration method 600 in FIG. 6 according to an embodiment. First sensitivity calculating step 610 includes: value determining step 710 for applying perturbation to property values according to a perturbation size, to obtain multiple perturbation values, and determining multiple values of the variable parameters corresponding to the multiple perturbation values; linear regression step 730 for using linear regression to approximate the multiple values of the variable parameters, to obtain an approximation result; and sensitivity obtaining step 770 for obtaining the first sensitivity according to the approximation result.

Figure 8:
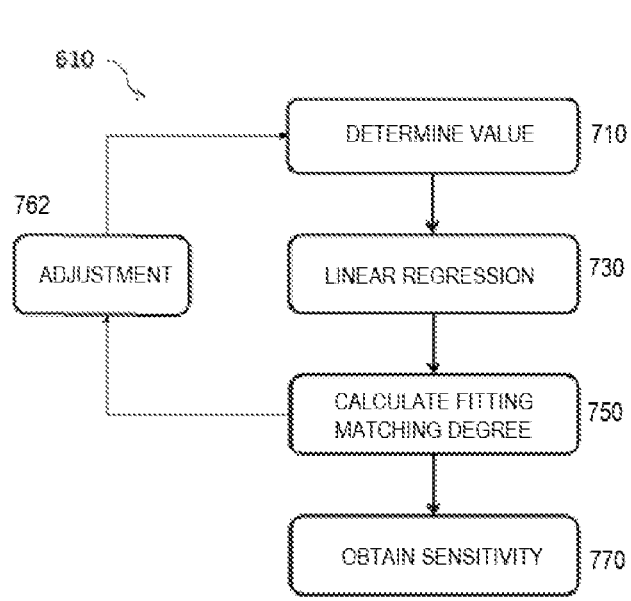
FIG. 8 is a schematic flowchart of the sensitivity determining step in the calibration method in FIG. 6 according to another embodiment.

FIG. 8 is a schematic flowchart of sensitivity determining step 610 in the calibration method 600 in FIG. 6 according to a specific embodiment. The embodiment described in FIG. 8 is a variant of the embodiment described in FIG. 7, while the difference lies in that sensitivity determining step 610 further includes: fitting matching degree calculation step 750 for calculating a fitting matching degree between multiple values of variable parameters and an approximation result, and going to sensitivity obtaining step 770 when the fitting matching degree falls within a preset range; and perturbation size adjustment step 762 for adjusting a perturbation size when the fitting matching degree does not fall within the preset range, and going to value determining step 710.

Figure 9:
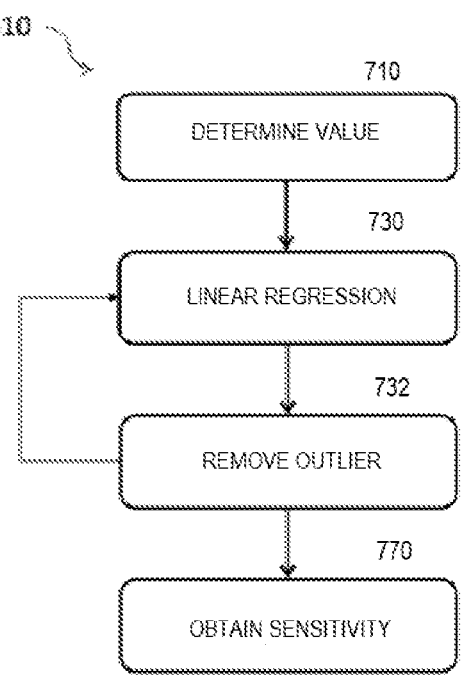
FIG. 9 is a schematic flowchart of the sensitivity determining step in the calibration method in FIG. 6 according to yet another embodiment.

FIG. 9 is a schematic flowchart of sensitivity determining step 610 in the calibration method 600 in FIG. 6 according to a specific embodiment. The embodiment described in FIG. 9 is a variant of the embodiment described in FIG. 7, the difference lies in that sensitivity determining step 610 further includes removal step 732 for removing an outlier when it is determined according to an approximation result that the outlier exists in multiple values of variable parameters, and going to linear regression step 730, and when it is determined according to the approximation result that no outlier exists in the multiple values of the variable parameters, going to sensitivity obtaining step 770.

Figure 10:
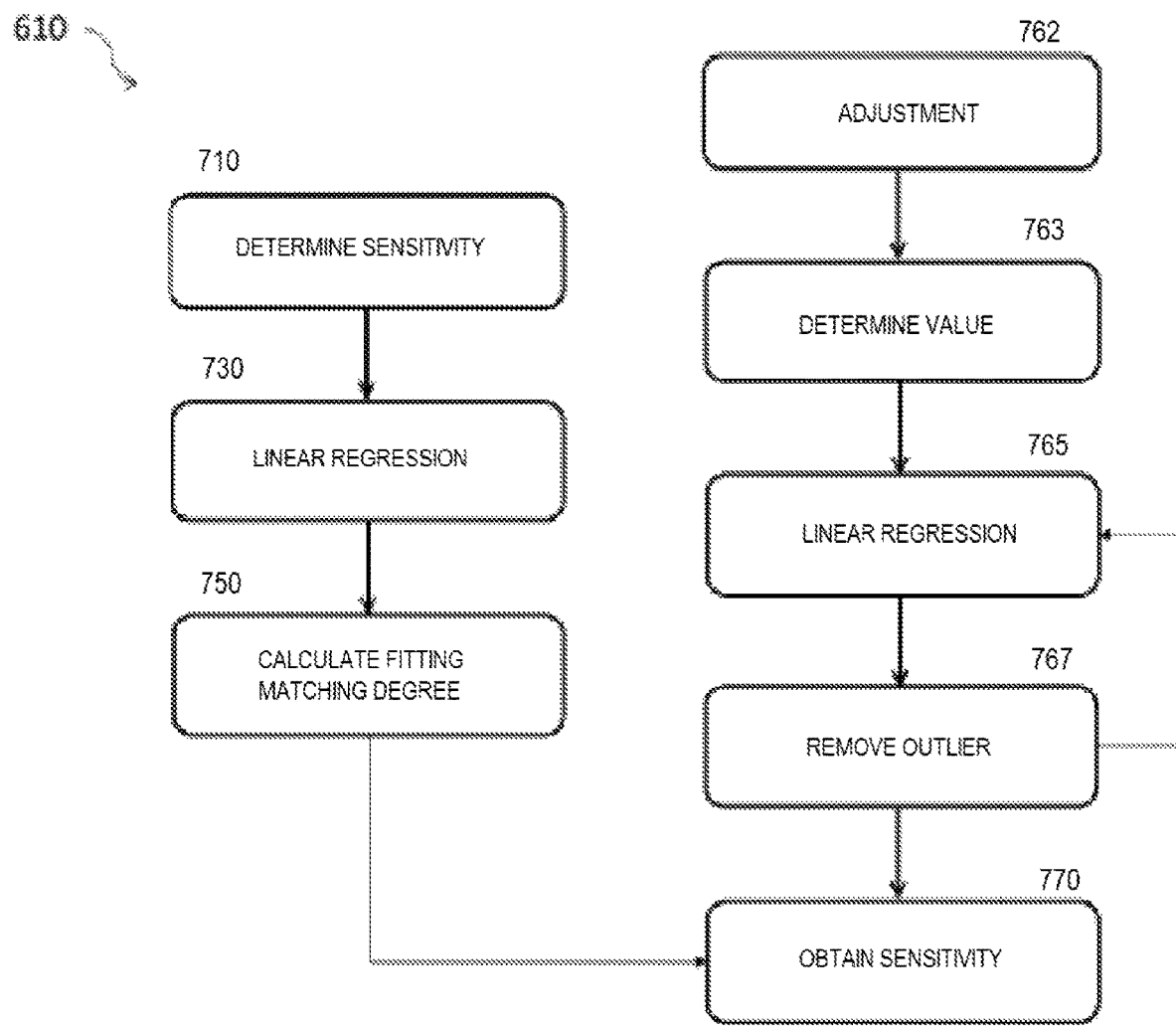
FIG. 10 is a schematic flowchart of the sensitivity determining step in the calibration method in FIG. 6 according to still another embodiment.

FIG. 10 is a schematic flowchart of sensitivity determining step 610 in the calibration method 600 in FIG. 6 according to a specific embodiment. The embodiment described in FIG. 10 is a variant of the embodiments described in FIG. 8 and FIG. 9. Sensitivity determining step 610 of the embodiment described in FIG. 10 includes: value determining step 710 for applying perturbation to property values according to a perturbation size, to obtain multiple perturbation values, and determining multiple values of variable parameters corresponding to the multiple perturbation values; linear regression step 730 for using linear regression to approximate the multiple values of the variable parameters, to obtain an approximation result; fitting matching degree calculation step 750 for calculating a fitting matching degree between the multiple values of the variable parameters and the approximation result, and going to sensitivity obtaining step 770 when the fitting matching degree falls within a preset range; perturbation size adjustment step 762 for adjusting a perturbation size when the fitting matching degree does not fall within the preset range, and going to value determining step 763; value determining step 763 for applying perturbation to property values according to an adjusted perturbation size, to obtain multiple new perturbation values, and determining multiple new values of the variable parameters corresponding to the new multiple perturbation values; linear regression step 763 for using linear regression to approximate the multiple new values of the variable parameters, to obtain a new approximation result; removal step 767 for removing an outlier when it is determined according to the new approximation result that the outlier exists in the multiple values of the variable parameters, and going to linear regression step 765, and when it is determined according to the new approximation result that no outlier exists in the multiple new values of the variable parameters, going to sensitivity obtaining step 770; and sensitivity obtaining step 770 for obtaining a first sensitivity according to the approximation result.

SIMULATION EXAMPLES

The following provides some simulation examples of determining sensitivity. The following simulation examples may provide reference for a person of ordinary skill in the art. These examples would not limit the scope of claims.

Example 1

The sensitivity determining module 150 shown in FIG. 3 is used to perform the sensitivity determining step shown in FIG. 8. In the example, a property value $\sigma_1$ of a property $\theta_1$ is normalized to be 1, a perturbation size is 2%, a variable parameter is a pressure drop $P_1$, and a preset range is greater than 85%.

Figure 11:
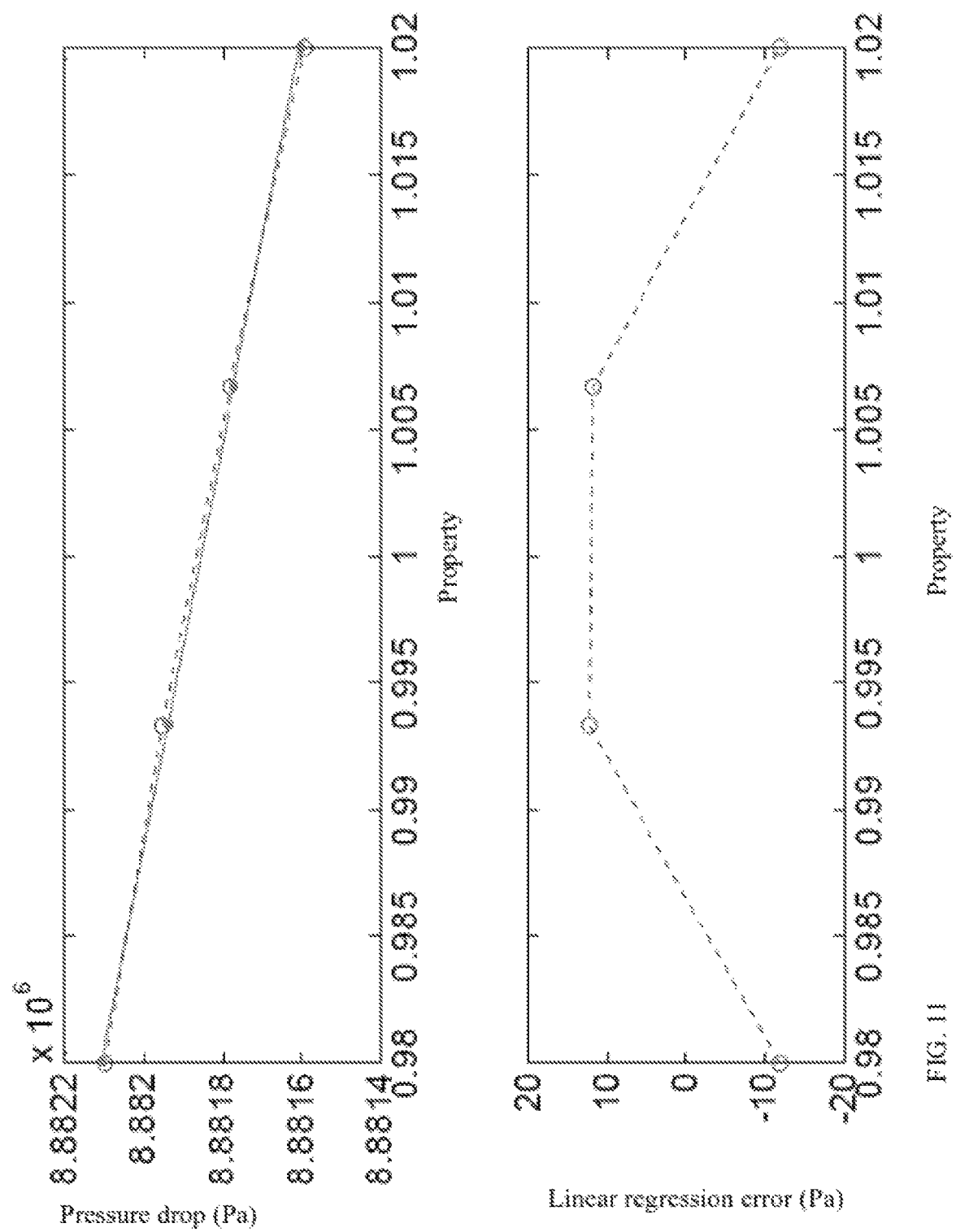
FIG. 11 is a schematic diagram of an obtained approximation result of linear regression and a corresponding linear regression error in Example 1.

After value determining step 710 and linear regression step 730 are performed, an obtained approximation result of linear regression is shown in a coordinate graph in the upper part of FIG. 11. The horizontal axis of the coordinate graph in the upper part represents properties (normalized and unitless), and the vertical axis represents pressure drops (the unit is pascal, called Pa for short hereinafter). A coordinate graph in the lower part of FIG. 11 shows a linear regression error of multiple values of a pressure drop $P_1$ corresponding to each perturbation value. The horizontal axis of the coordinate graph in the lower part represents properties (normalized and unitless), and the vertical axis represents linear regression errors (the unit is Pa); and a standard deviation of linear regression errors of each value of the pressure drop $P_1$ is 1.4E+01 (Pa).

After fitting matching degree calculation step 750 is performed, a goodness of fit is 99.6%. Because 99.6% is greater than 85%, sensitivity obtaining step 770 is performed to obtain a first sensitivity: for every 1% increase in the property value, the pressure drop decreases by 13 Pa.

Example 2

The sensitivity determining module 150 shown in FIG. 3 is used to perform the sensitivity determining step shown in FIG. 8. In the example, a property value $\sigma_2$ of a property $\theta_2$ is normalized to be 1, a perturbation size is 2%, a variable parameter is a pressure drop $P_2$, and a preset range is greater than 85%.

Figure 12:
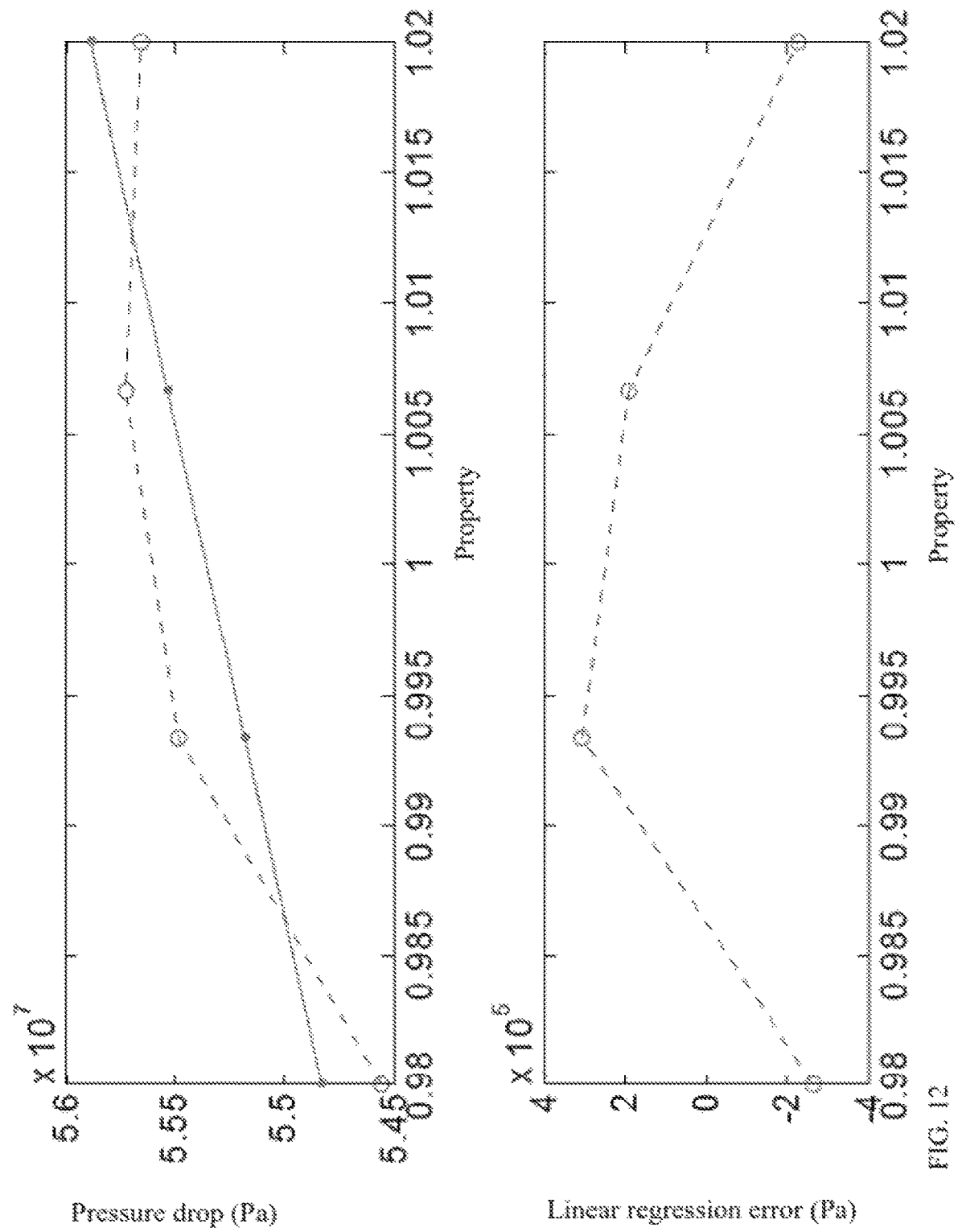
FIG. 12 is a schematic diagram of an approximation result of linear regression and a corresponding linear regression error when a perturbation size is 2% in Example 2.

After value determining step 710 and linear regression step 730 are performed, an obtained approximation result of linear regression is shown in a coordinate graph in the upper part of FIG. 12. The horizontal axis of the coordinate graph in the upper part represents properties (normalized and unitless), and the vertical axis represents pressure drops (the unit is Pa). A coordinate graph in the lower part of FIG. 12 shows a linear regression error of multiple values of a pressure drop $P_2$ corresponding to each perturbation value. The horizontal axis of the coordinate graph in the lower part represents properties (normalized and unitless), and the vertical axis represents linear regression errors (the unit is Pa); and a standard deviation of linear regression errors of each value of the pressure drop $P_2$ is 2.9E+05 (Pa).

After fitting matching degree calculation step 750 is performed, an obtained goodness of fit is 71.3%. Because 71.3% is less than 85%, perturbation size adjustment step 762 is performed to increase a perturbation size to be 8%.

Figure 13:
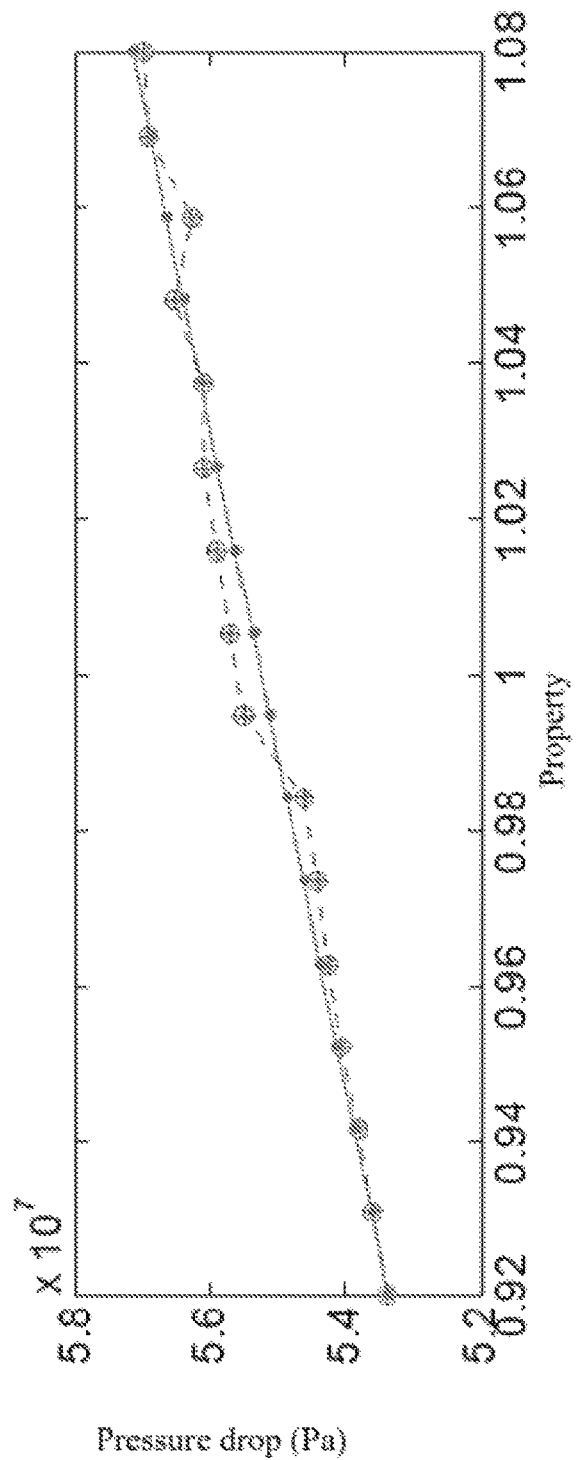
FIG. 13 is a schematic diagram of an approximation result of linear regression and a corresponding linear regression error when a perturbation size is 8% in Example 2.
Figure 13:
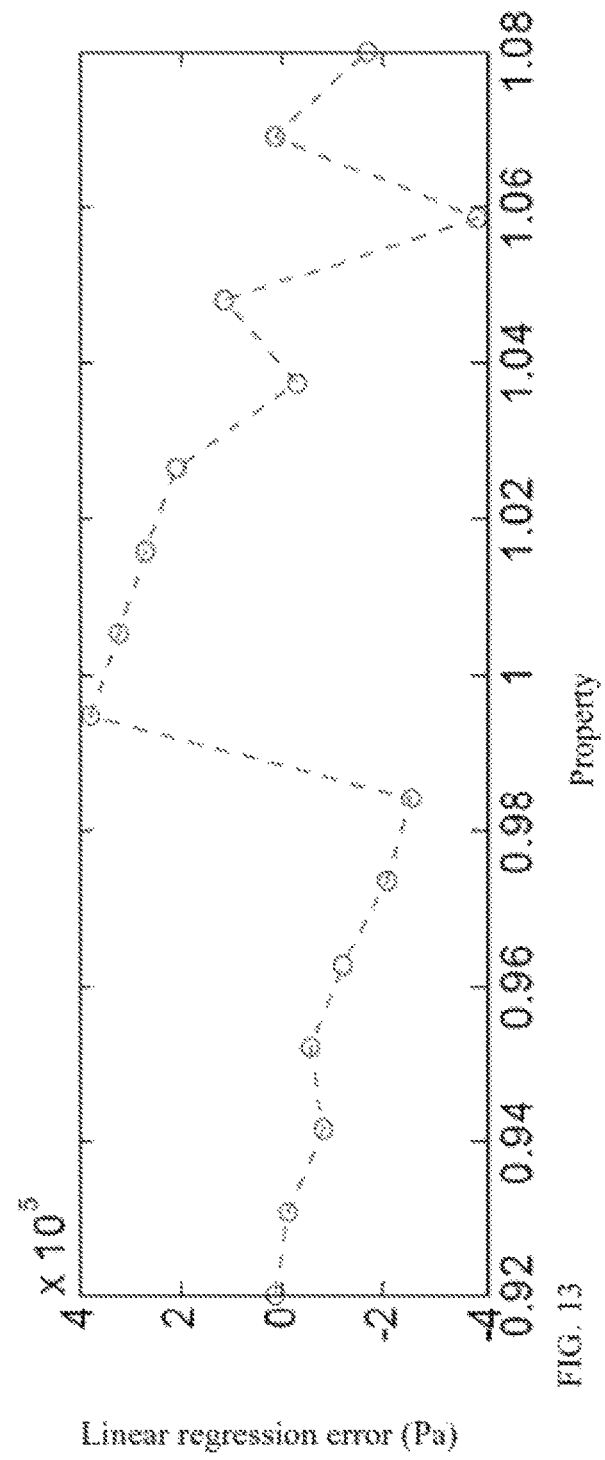

On the basis of a perturbation size of 8% and after value determining step 710 and linear regression step 730 are re-performed, an obtained approximation result of linear regression is shown in a coordinate graph in the upper part of FIG. 13. The horizontal axis of the coordinate graph in the upper part represents properties (normalized and unitless), and the vertical axis represents pressure drops (the unit is Pa). A coordinate graph in the lower part of FIG. 13 shows a linear regression error of each new value of a pressure drop $P_2$. The horizontal axis of the coordinate graph in the lower part represents properties (normalized and unitless), and the vertical axis represents linear regression errors (the unit is Pa); and a standard deviation of linear regression errors of each new value of the pressure drop $P_2$ is 2.1E+05 (Pa).

After fitting matching degree calculation step 750 is re-performed, an obtained goodness of fit is 96.9%. Because 96.9% is greater than 85%, sensitivity obtaining step 770 is performed to obtain a first sensitivity: for every 1% increase in the property value, the pressure drop increases by 2.35E+4 Pa.

Example 3

The sensitivity determining module 150 shown in FIG. 5 is used to perform the sensitivity determining step shown in FIG. 10. In the example, a property value $\sigma_3$ of a property $\delta_3$ is normalized to be 1, a perturbation size is 2%, a variable parameter is a pressure drop $P_3$, and a preset range is greater than 85%. A manner for identifying an outlier is that a ratio of a linear regression error of a value of the pressure drop $P_3$ to a standard deviation of linear regression errors of all values of the pressure drop $P_3$ is greater than 2.

Figure 14:
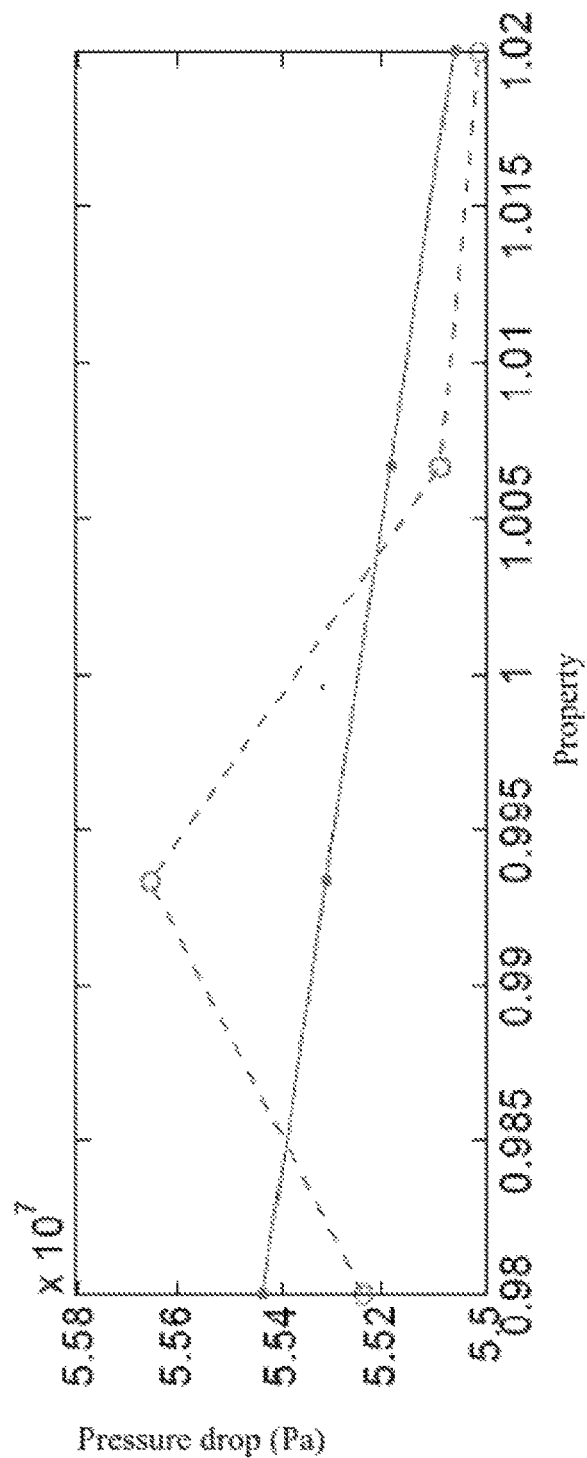
FIG. 14 is a schematic diagram of an approximation result of linear regression and a corresponding linear regression error when a perturbation size is 2% in Example 3.
Figure 14:
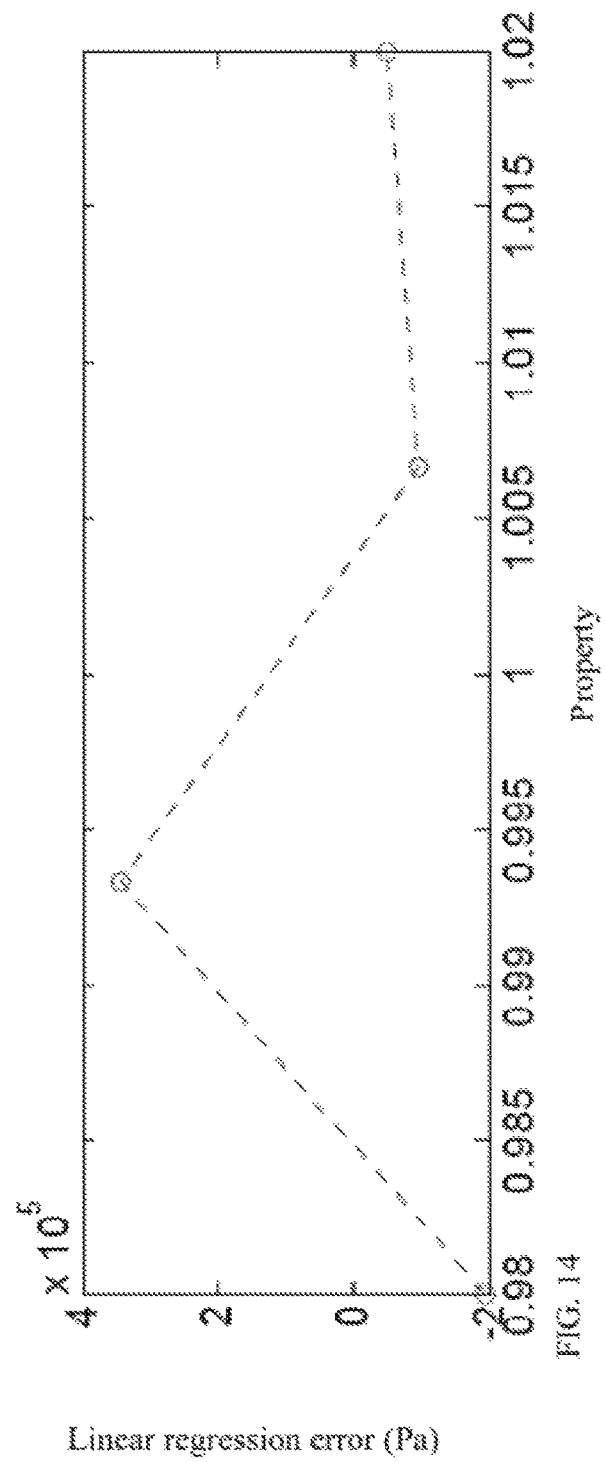

After value determining step 710 and linear regression step 730 are performed, an obtained approximation result of linear regression is shown in a coordinate graph in the upper part of FIG. 14. The horizontal axis of the coordinate graph in the upper part represents properties, and the vertical axis represents pressure drops (the unit is Pa). A coordinate graph in the lower part of FIG. 13 shows a linear regression error of each value of a pressure drop $P_3$. The horizontal axis of the coordinate graph in the lower part represents properties (normalized and unitless), and the vertical axis represents linear regression errors (the unit is Pa); and a standard deviation of linear regression errors of each perturbation value is 2.4E+0.5 (Pa).

After fitting matching degree calculation step 750 is performed, an obtained goodness of fit is 31.6%. Because 31.6% is less than 85%, perturbation size adjustment step 762 is performed to increase a perturbation size to be 8%.

Figure 15:
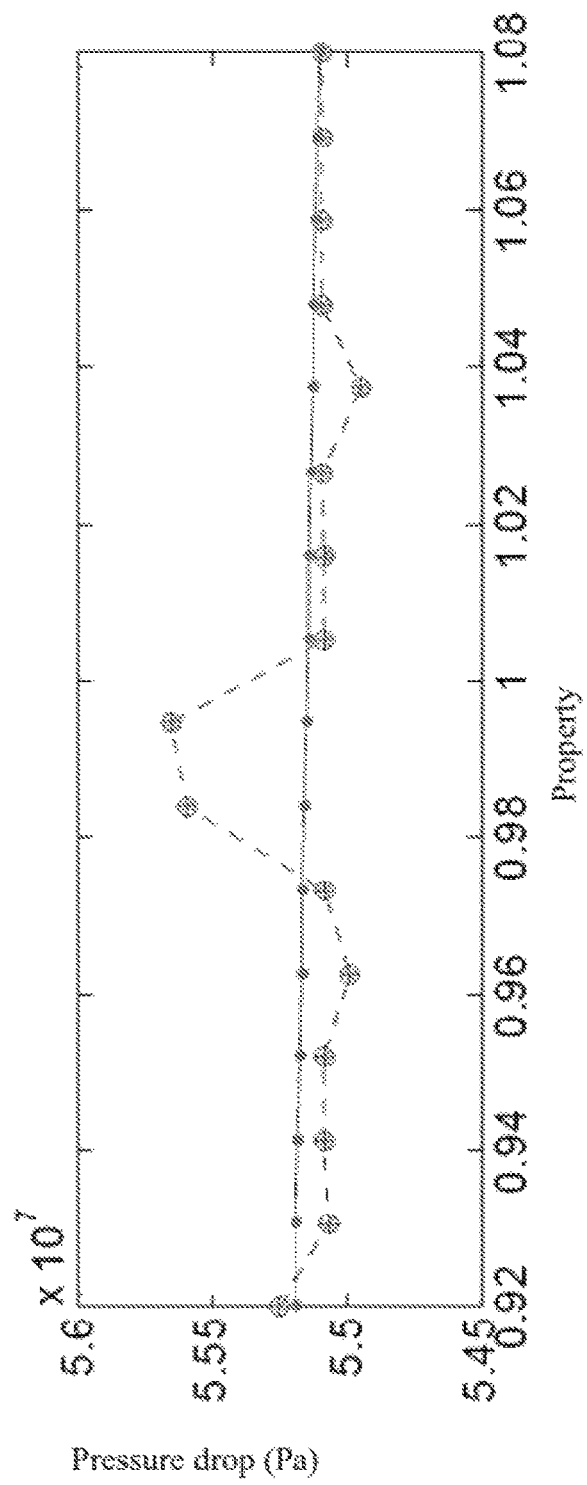
FIG. 15 is a schematic diagram of an approximation result of linear regression and a corresponding linear regression error when a perturbation size is 8% in Example 3.
Figure 15:
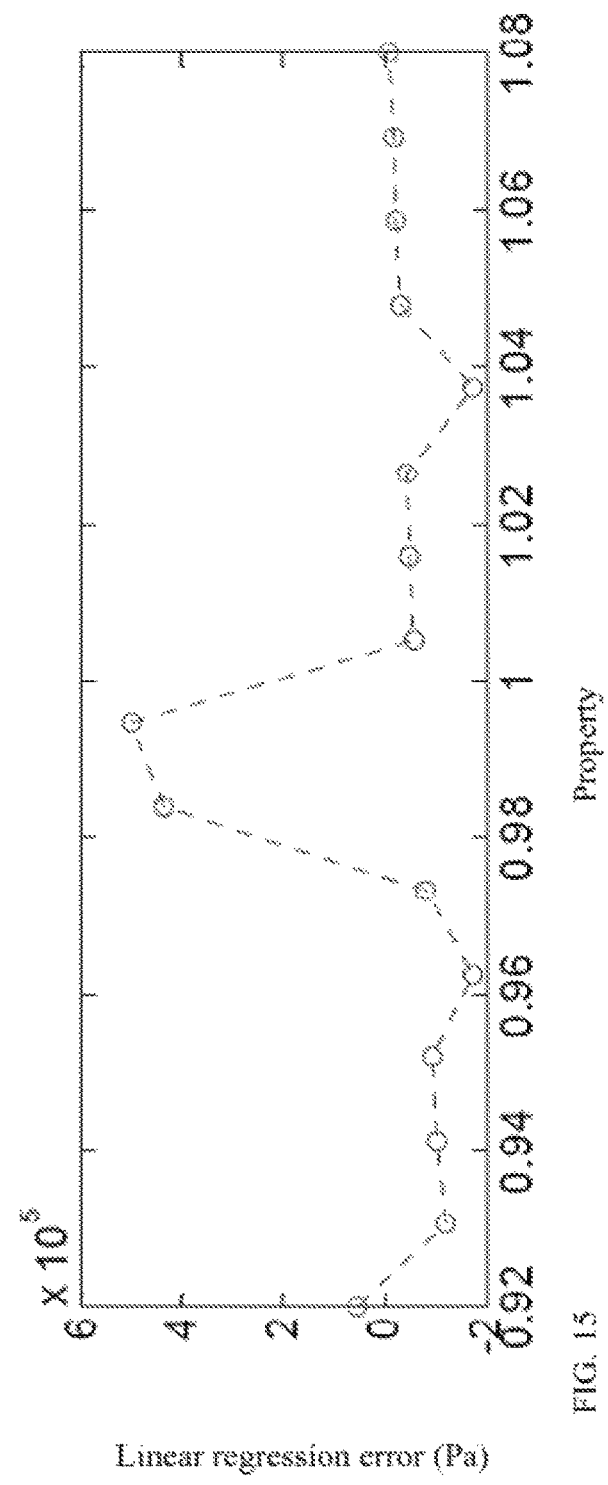

On the basis of a perturbation size of 8% and after value determining step 763 and linear regression step 765 are performed, an obtained approximation result of linear regression is shown in a coordinate graph in the upper part of FIG. 15. The horizontal axis of the coordinate graph represents properties (normalized and unitless), and the vertical axis represents pressure drops (the unit is Pa). A coordinate graph in the lower part of FIG. 15 shows a linear regression error of each new value of a pressure drop $P_3$. The horizontal axis of the coordinate graph in the lower part represents properties (normalized and unitless), and the vertical axis represents linear regression errors (the unit is Pa); and a standard deviation of linear regression errors of each new value of the pressure drop $P_3$ is 1.9E+05 (Pa).

Figure 16:
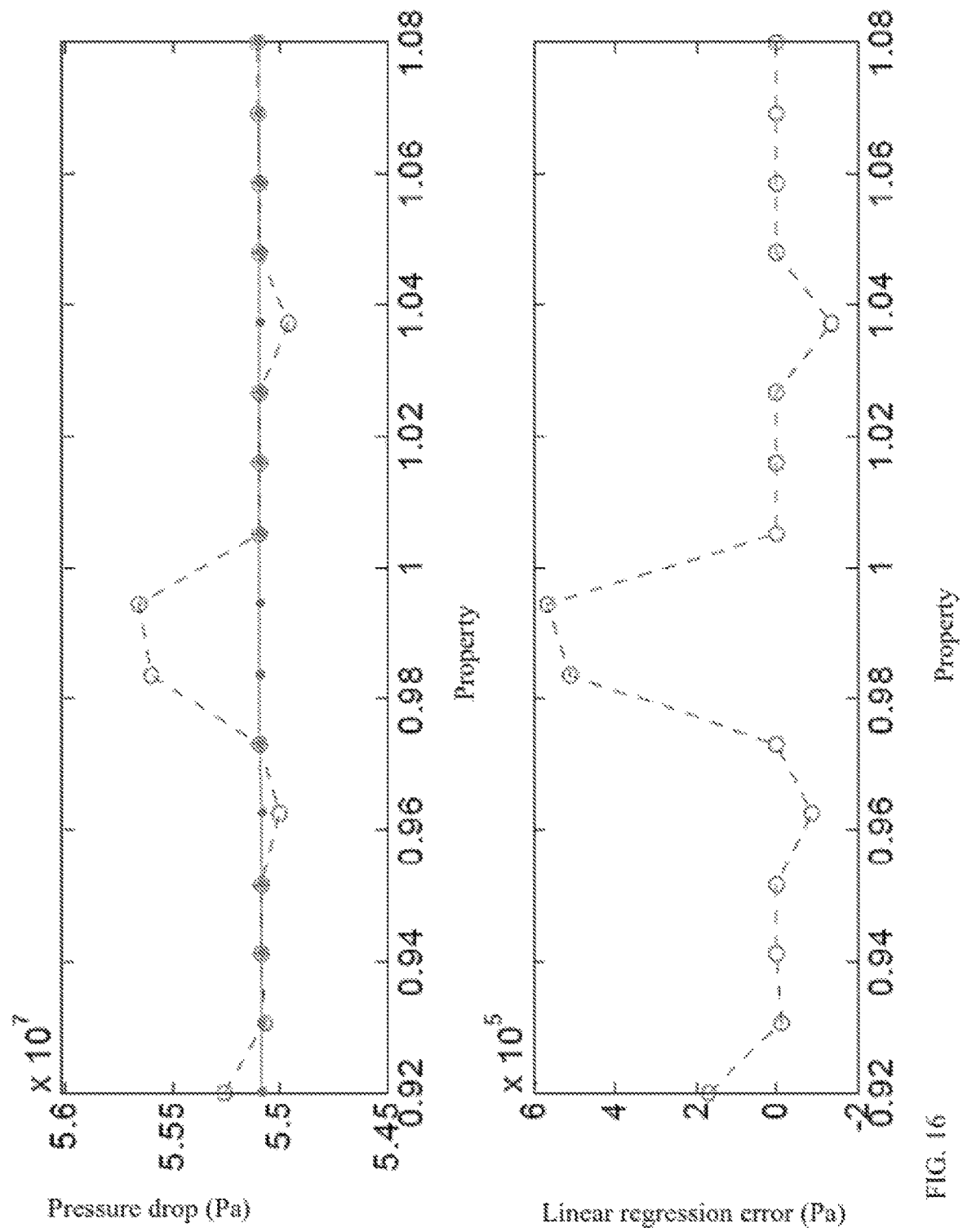
FIG. 16 is a schematic diagram of an approximation result of linear regression and a corresponding linear regression error when a perturbation size is 8% and after an outlier is removed in Example 3.

Then, removal step 767 is performed, and an outlier in the linear regression errors that is greater than 2*19E+05 is removed. An approximation result of linear regression after removal is shown in a coordinate graph in the upper part of FIG. 16. The horizontal axis of the coordinate graph in the upper part represents properties (normalized and unitless), and the vertical axis represents pressure drops (the unit is Pa). An empty circle in the coordinate graph in the upper part of FIG. 16 represents the removed outlier, where a straight line represents an obtained approximation result of linear regression based on a value (that is, multiple values from which the outlier is removed) corresponding to a solid circle. A coordinate graph in the lower part of FIG. 16 shows a linear regression error of all values of the pressure drop $P_3$ when the perturbation size is 8% relative to the result of linear regression shown in the upper part of FIG. 16, and the horizontal axis of the coordinate graph in the lower part represents properties (normalized and unitless), and the vertical axis represents linear regression errors (the unit is Pa).

Then, sensitivity obtaining step 770 is performed to obtain a first sensitivity: every 1% increase in the property value, the pressure drop decreases by 87 Pa; in addition, a standard deviation of a linear regression error of the pressure drop $P_3$ after the removal of the outlier is 5.1E+02 (Pa), and a goodness of fit is 98.6%.

Although the present disclosure is explained based on specific embodiments, it can be understood by those of the skills in this field that it can be modified in many ways. Therefore, it should be aware that, intention of the claims lies in all the modifications and variations covered in a real concept and scope of the present disclosure.

What is claimed is:

1. A calibration apparatus for calibrating a virtual flow meter for a production system, wherein the production system comprises an element for transferring a fluid, and the virtual flow meter is configured to estimate a flow rate of the fluid based on an attribute value of the element and a value of a variable parameter of the element, the calibration apparatus comprises:

a sensitivity determining module for calculating a first sensitivity indicating an extent of change of the value of the variable parameter with respect to a perturbation of the attribute value;

a calibration module for calibrating the virtual flow meter based on the first sensitivity, wherein the sensitivity determining module comprises:

a value determination unit for obtaining a plurality of perturbed values based on perturbations imposed on the attribute value according to a perturbation size, and determining a plurality of values of the variable parameter corresponding to the plurality of perturbed values;

a linear regression unit for approximating the plurality of values of the variable parameter by applying a linear regression to obtain an approximated result;

a sensitivity obtaining unit for obtaining the first sensitivity based on the approximated result;

a fitting matching degree calculation unit for calculating a fitting matching degree between the plurality of values of the variable parameter and the approximated result, and outputting the approximated result to the sensitivity obtaining unit when the fitting matching degree belongs to a predetermined range; and a perturbation size adjusting unit for adjusting the perturbation size when the fitting matching degree does not belong to the predetermined range and outputting the adjusted perturbation size to the value determination unit; and a sensitivity calculation module for calculating a second sensitivity indicating an extent of change of the flow rate with respect to a perturbation of the value of the variable parameter, wherein the calibration module obtains, based on the first sensitivity and the second sensitivity, a third sensitivity indicating an extent of change of the flow rate with respect to the perturbation of the attribute value, and calibrates the virtual flow meter based on the third sensitivity.

2. The calibration apparatus of claim 1, wherein the sensitivity determining module further comprises:
a removal unit for removing an outlier and outputting values of the variable parameter with the outlier removed to the linear regression unit when the outlier is identified in the plurality of values of the variable parameter based on the approximated result, and outputting the approximated result of the linear regression to the sensitivity obtaining unit when the outlier is not identified in the plurality of values of the variable parameter based on the approximated result.

3. The calibration apparatus of claim 1, wherein the element comprises a pipeline, a valve, a pump, a choke or any combination thereof.

4. The calibration apparatus of claim 1, wherein the variable parameter comprises a pressure drop of the element, a temperature of the element, or a combination thereof.

5. A calibration method for calibrating a virtual flow meter for a production system, wherein the production system comprises an element for transferring a fluid, the virtual flow meter estimates a flow rate of the fluid based on an attribute value of the element and a value of a variable parameter of the element, the calibration method comprises:
a sensitivity determining step for calculating a first sensitivity indicating an extent of change of the value of the variable parameter with respect to a perturbation of the attribute value;
a calibration step for calibrating the virtual flow meter based on the first sensitivity;
wherein the sensitivity determining step comprises:
obtaining a plurality of perturbed values based on perturbations imposed on the attribute value according to a perturbation size, and determining a plurality of values of the variable parameter corresponding to the plurality of perturbed values;
approximating the plurality of values of the variable parameter by applying a linear regression to obtain an approximated result;
obtaining the first sensitivity based on the approximated result;
calculating a fitting matching degree between the plurality of values of the variable parameter and the approximated result, and outputting the approximated result to the sensitivity obtaining unit when the fitting matching degree belongs to a predetermined range;
adjusting the perturbation size when the fitting matching degree does not belong to the predetermined range and outputting the adjusted perturbation size to the value determination unit;
calculating a second sensitivity indicating an extent of change of the flow rate with respect to a perturbation of the value of the variable parameter;
obtaining, based on the first sensitivity and the second sensitivity, a third sensitivity indicating an extent of change of the flow rate with respect to the perturbation of the attribute value; and
calibrating the virtual flow meter based on the third sensitivity.

* * * * *